US010234035B2

United States Patent
Nitta

(10) Patent No.: US 10,234,035 B2
(45) Date of Patent: Mar. 19, 2019

(54) SEAL STRUCTURE OF REGULATING VALVE GLAND PORTION

(71) Applicant: Azbil Corporation, Tokyo (JP)

(72) Inventor: Masashi Nitta, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/799,319

(22) Filed: Oct. 31, 2017

(65) Prior Publication Data

US 2018/0119819 A1   May 3, 2018

(30) Foreign Application Priority Data

Oct. 31, 2016  (JP) ................................ 2016-212627

(51) Int. Cl.
  *F16K 41/04*  (2006.01)
  *F16J 15/18*  (2006.01)

(52) U.S. Cl.
  CPC ............. *F16J 15/186* (2013.01); *F16K 41/04* (2013.01)

(58) Field of Classification Search
  CPC ....... F16J 15/186; F16K 41/04; F16K 5/0485; F16K 5/0694; F16K 41/043; F16K 41/046
  USPC .......................................... 251/214; 277/522
  See application file for complete search history.

(56) References Cited

U.S. PATENT DOCUMENTS

| 4,061,157 A | * | 12/1977 | Hanssen | F16K 41/00 137/242 |
| 4,886,241 A | * | 12/1989 | Davis | F16J 15/166 251/214 |
| 5,056,757 A | * | 10/1991 | Wood | F16J 15/183 251/214 |
| 5,129,625 A | | 7/1992 | Wood | |
| 5,593,166 A | * | 1/1997 | Lovell | F16J 15/18 277/522 |
| 2011/0147632 A1 | * | 6/2011 | Brestel | F16K 41/026 251/214 |
| 2011/0278489 A1 | * | 11/2011 | Linser | F16K 41/02 251/355 |

FOREIGN PATENT DOCUMENTS

JP   2007-107657 A1   4/2007

\* cited by examiner

*Primary Examiner* — John Bastianelli
(74) *Attorney, Agent, or Firm* — Amster, Rothstein & Ebenstein LLP

(57) ABSTRACT

A regulating valve has a gland portion slidably holding a valve stem and the gland portion includes a lid member having a first through-hole into which the valve stem is inserted, gland packings disposed on a spacer provided between the inner wall of the first through-hole and the valve stem, a packing follower in which a first cylindrical portion is connected concentrically to a second cylindrical portion having an outer diameter smaller than the first cylindrical portion, disc springs laminated with each other on the first cylindrical portion to surround the second cylindrical portion of the packing follower, and a packing flange having a second through-hole into which the second cylindrical portion of the packing follower is inserted, the packing flange being disposed on the disc springs, the packing flange being fixed to the packing follower by fitting the second cylindrical portion to the second through-hole.

2 Claims, 7 Drawing Sheets

SEAL STRUCTURE OF REGULATING VALVE GLAND PORTION

CROSS-REFERENCE TO RELATED APPLICATIONS

The present application claims the benefit of and priority to Japanese Patent Application No. 2016-212627, filed on Oct. 31, 2016, the entire contents of which are incorporated by reference herein.

TECHNICAL FIELD

The present invention relates to a regulating valve and, more particularly, to, for example, the structure of a gland portion that prevents the leakage of a fluid, which is a control target, and that slidably holds a valve stem in a regulating valve.

BACKGROUND

Generally, gland packings are used in the gland portion of a regulating valve to prevent the leakage of a fluid from the inside of a valve box of the regulating valve. For example, in the gland portion of a general regulating valve, a plurality of gland packings is laminated in the axial line direction of the valve stem via a spacer in the gap between the inner wall of a stuffing box provided above a valve box and a valve stem, and the gland packings are tightened by a packing flange via a packing follower. This structure applies a pressure (referred to below as a contact surface pressure) to the contact surface between the gland packings and the surface of the valve stem and to the contact surface between the gland packings and the inner wall of the stuffing box, and this pressure prevents the leakage of the fluid in the valve box from the gap between the valve stem and the stuffing box.

In the regulating valve described above, since the gland packings expand when the temperature rises, the contact surface pressure between the gland packings and the valve stem rises. When the valve stem slides repeatedly in the state in which the contact surface pressure rises, the gland packings wear and the seal performance may degrade.

Accordingly, many regulating valves use disc springs to suppress increase in the contact surface pressure due to thermal expansion (see PTL 1). Specifically, as disclosed in PTL 1, a plurality of disc springs are laminated in the slide direction of the valve stem between the packing follower and the packing flange. Since this can release the increase in the volume of the gland packings due to thermal expansion as the displacement of the disc springs in the axial line direction of the valve stem via the packing follower, increase in the contact surface pressure between the gland packings and the valve stem can be suppressed.

However, as described in PTL 1, the conventional regulating valve uses a spring case to hold disc springs between the packing follower and the packing flange. Since this spring case has a relatively large size and high component cost among components included in the regulating valve, the number of disc springs that can be laminated between the packing follower and packing flange is limited and the production cost of the regulating valve becomes high.

On the other hand, PTL 2 discloses a regulating valve having the structure in which a plurality of disc springs disposed between the packing follower and the packing flange is held by the packing flange and gland nuts without using a spring case.

CITATION LIST

Patent Literature

[PTL 1] JP-A-2007-107657
[PTL 2] U.S. Pat. No. 5,129,625

SUMMARY

Generally, it is recommended that the gland nuts of a regulating valve are tightened with a specified torque by a torque wrench. However, in a site at which a regulating valve is installed, the gland nuts are often tightened without using a torque wrench.

Since there is a gap between the packing follower and the packing flange in the regulating valve disclosed in PTL 2, if the gland nuts are tightened without using a torque wrench, the two gland nuts are not tightened evenly, compression loads applied to the gland packings via the packing flange become non-uniform, and the fluid may leak between the valve stem and the gland packings.

In addition, when the two gland nuts are not tightened evenly, the packing flange is fixed obliquely instead of vertically with respect to the valve stem and a high pressure may be applied to a part of the contact surface between the valve stem and the packing follower locally. In particular, the regulating valve disclosed in PTL 2 has the structure for preventing the leakage of the fluid in the valve box by improving the contact between the inner wall covered with special coating of the packing follower and the valve stem. Accordingly, if the packing flange is fixed obliquely with respect to the valve stem, the pressure applied to a part of the contact surface between the valve stem and the packing follower is thought to be very high. When the valve stem slides repeatedly in this state, the valve stem and the packing follower that have the contact surface to which a high pressure is applied wear and wear powder is generated. When this wear powder enters the gap between the gland packings and the valve stem, wear of the gland packings is promoted, possibly reducing the seal performance.

The invention addresses the above problems with an object of suppressing deterioration of the seal performance of the gland portion of a regulating valve while reducing the manufacturing cost of the regulating valve.

A regulating valve (100) according to the invention includes a valve box (1), a valve plug (2) disposed in the valve box (1), a valve stem (4) for driving the valve plug, and a gland portion (3) slidably holding the valve stem (4), in which the gland portion includes a lid member (5) mounted to the valve box and having a first through-hole (5a) into which the valve stem is inserted, a spacer (7) fixed between an inner wall of the first through-hole and the valve stem, a plurality of gland packings (8) laminated in a direction of an axis of the valve stem, the gland packings being disposed at an end of the spacer, the end being away from the valve box, a packing follower (9) including a second through-hole (90) into which the valve stem is inserted, the packing follower being disposed at an end of the plurality of gland packings, the end being away from the spacer, a first cylindrical portion (91) disposed closer to the gland packings, and a second cylindrical portion (92) extending in the direction of the axis (P) of the valve stem concentrically from an end of the first cylindrical portion, the end being away from the gland packing, the second cylindrical portion having an outer diameter smaller than the first cylindrical portion, a plurality of disc springs (10) disposed on the first cylindrical portion of the packing follower so as to surround the second cylindrical portion of the packing follower, a packing flange (11) having a third through-hole (11a) into which the second cylindrical portion of the packing follower is inserted, the packing flange being disposed on the plurality of disc springs, wherein the packing flange is fixed to the packing follower by fitting the second cylindrical portion of the packing follower to the third through-hole.

In the regulating valve, a gap (14) may be formed between the second through-hole and the valve stem.

In the regulating valve, a gap (15) may be formed between the spacer and the valve stem.

The regulating valve (100) may further include a gland nut (13) tightened to fix the packing flange to the lid member, in which the second cylindrical portion has a first principal surface (92b) orthogonal to the valve stem at an end thereof, the end being away from the valve box, the packing flange has a second principal surface (11c) orthogonal to the valve stem at an end thereof, the end being away from the valve box, and a tightening torque of the gland nut may be a specified torque when the first principal surface and the second principal surface have the same height as seen from a direction (X axis or Y axis) orthogonal to the valve stem.

The regulating valve (100A) further includes a gland nut (13) tightened to fix the packing flange to the lid member, in which the second cylindrical portion has a first principal surface (92b) orthogonal to the valve stem at an end thereof, the end being away from the valve box, the third through-hole of the packing flange includes a first hole (211) formed in a part thereof closer to the valve box, the first hole being formed concentrically with the second through-hole, and a second hole (212) formed in a part thereof away from the valve box, the second hole being connected to the first hole, the second hole having a diameter smaller than the first hole, the packing flange is fixed to the packing follower by fitting an outer peripheral surface of the second cylindrical portion to the first hole, the valve stem is inserted into the second through-hole of the packing follower through the second hole, a gap (16) is formed between the second hole and the valve stem, and a tightening torque of the gland nut may be a specified torque when the first principal surface (92b) makes contact with a boundary surface (213) between the first hole and the second hole of the packing flange.

In the above description, as an example, reference numerals in drawings corresponding to components of the invention are designated in parentheses.

As described above, according to the invention, it is possible to suppress deterioration of the seal performance of the gland portion of the regulating valve while reducing the manufacturing cost of the regulating valve.

DETAILED DESCRIPTION

Embodiments of the invention will be described below with reference to the drawings.

Embodiment 1

Figure 1:
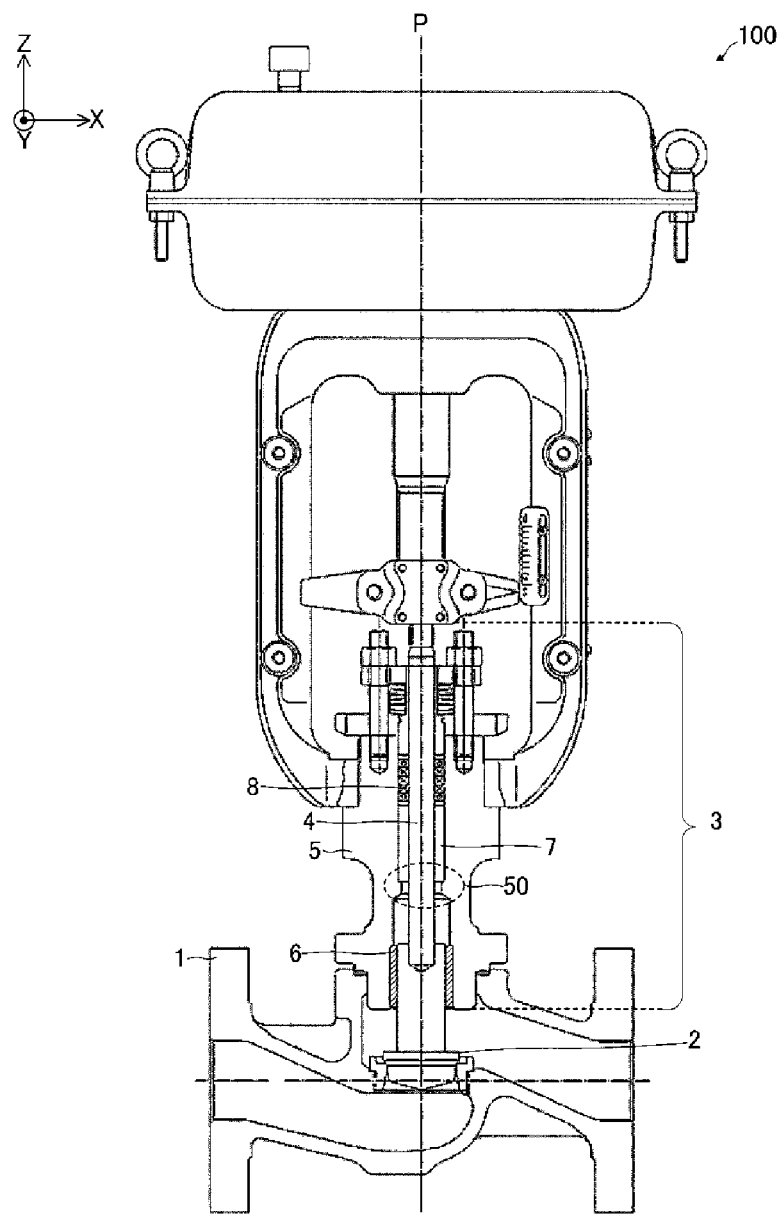
FIG. 1 schematically illustrates a regulating valve according to embodiment 1 of the invention.

FIG. 1 schematically illustrates the regulating valve according to embodiment 1 of the invention.

A regulating valve 100 illustrated in FIG. 1 is a glove-shaped regulating valve which controls a flow of a fluid from one flow channel to another flow channel. In addition, the fluid introduced into the regulating valve 100 may be a liquid or gas, and is not particularly limited.

The regulating valve 100 includes a valve box 1, a valve plug 2 disposed in the valve box 1, a valve stem 4 for driving the valve plug 2, and a gland portion 3 for slidably holding the valve stem 4.

The gland portion 3 has the structure for preventing the leakage of the fluid, which is a control target, and holding a plurality of disc springs without using a spring case and the structure capable of evenly tightening the packing flange. The structure of the gland portion 3 will be described in detail below.

Figure 2:
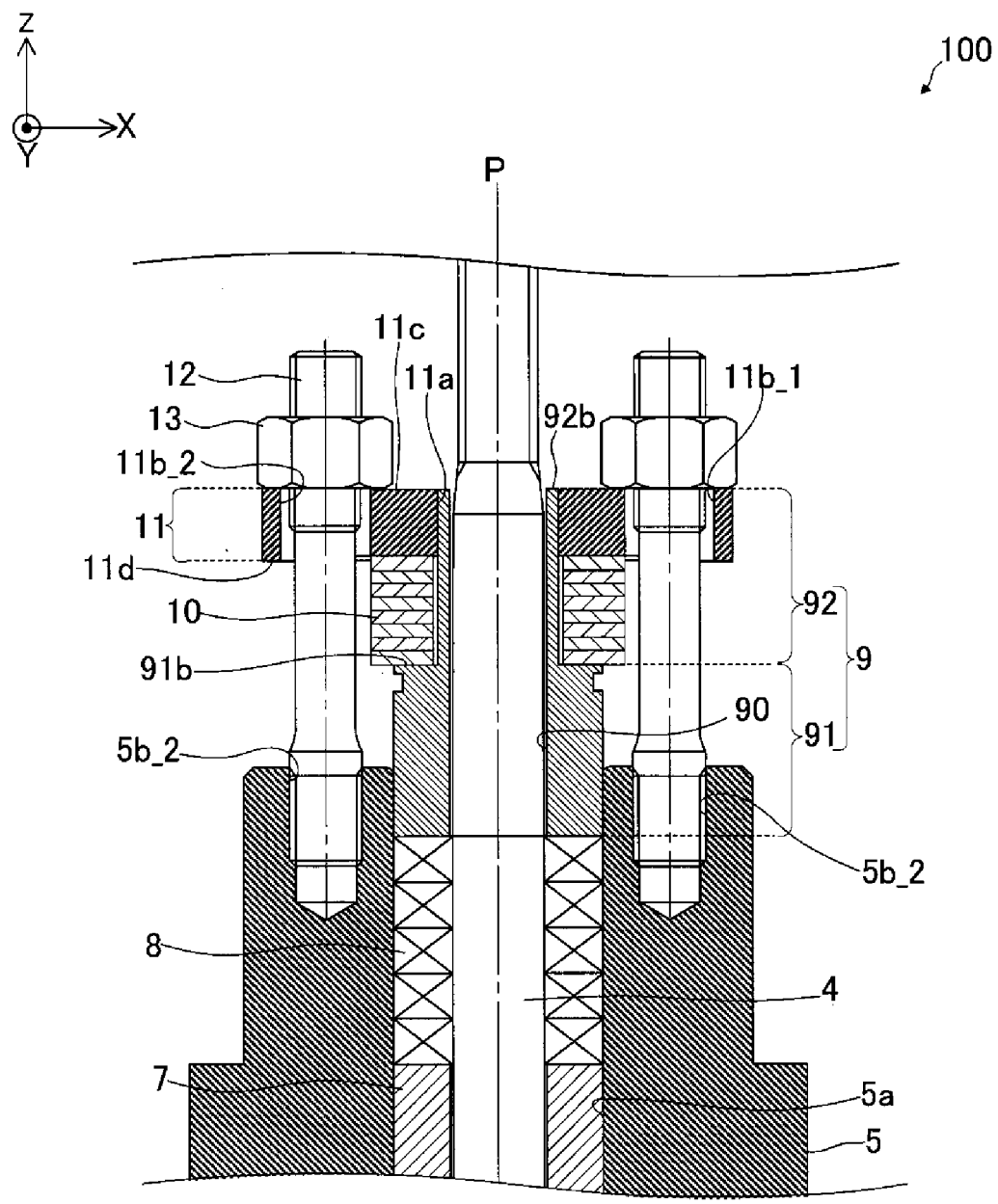
FIG. 2 schematically illustrates the cross-sectional structure of a gland portion of the regulating valve according to embodiment 1.

FIG. 2 schematically illustrates the cross-sectional structure of the gland portion 3 of the regulating valve 100 according to embodiment 1.

Figure 3:
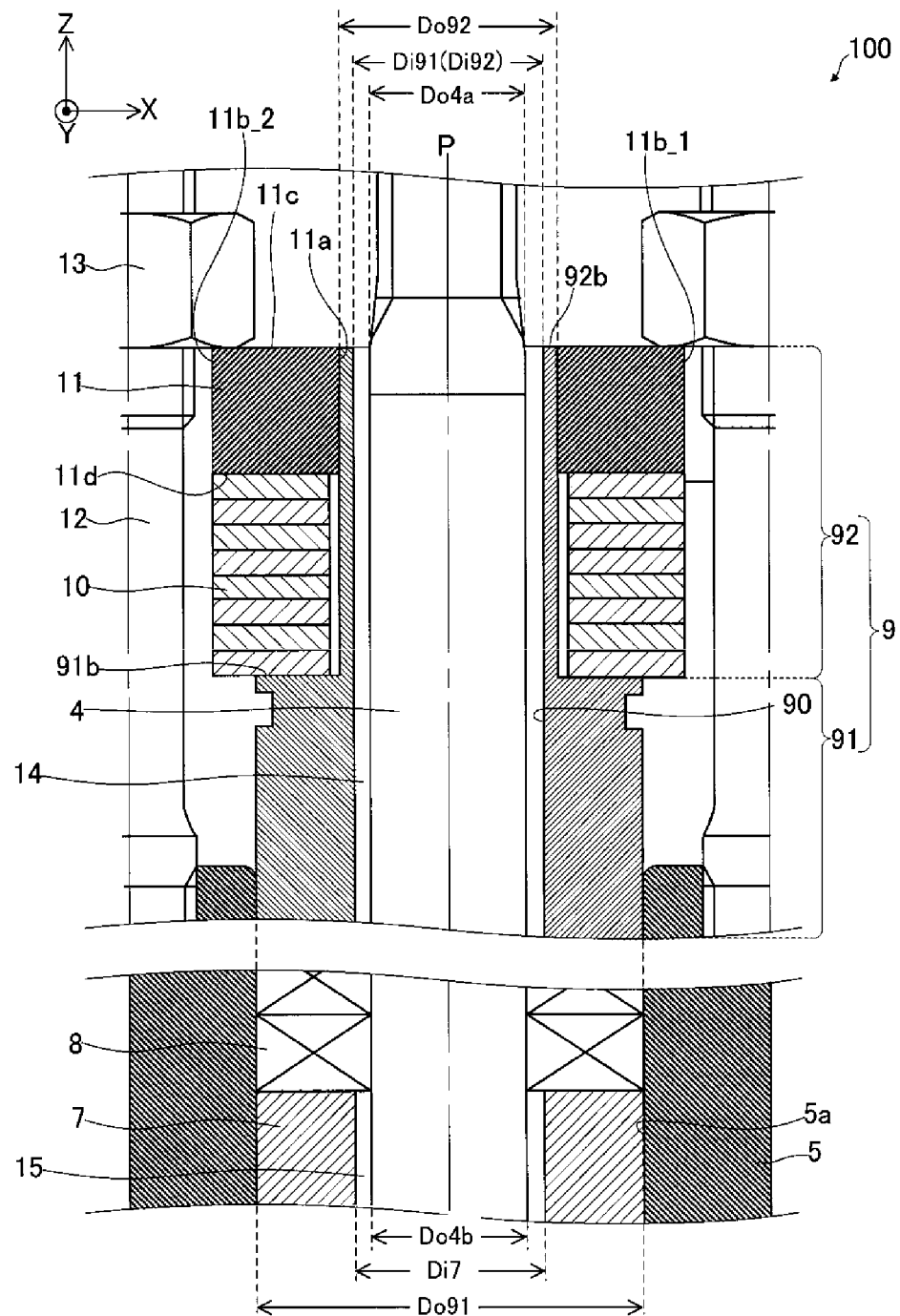
FIG. 3 is an enlarged view illustrating a part of the cross-sectional structure of the gland portion illustrated in FIG. 2.

FIG. 3 is an enlarged view illustrating a part of the cross-sectional structure of the gland portion 3 illustrated in FIG. 2.

As illustrated in FIGS. 1 to 3, the gland portion 3 of the regulating valve 100 includes a stuffing box 5, a guide ring 6, a spacer 7, gland packings 8, a packing follower 9, disc springs 10, a packing flange 11, gland studs 12, and gland nuts 13. Of these components, the components other than the gland packings 8 are made of a material (for example, metal) capable of preventing deformation or corrosion due to circulation of the fluid.

The stuffing box 5 is a lid member that has a through-hole 5a communicating with the inside of the valve box 1 and is fixed to the upper part (positive direction of the Z axis) of the valve box 1. In the stuffing box 5, the valve stem 4 is inserted into the through-hole 5a.

The guide ring 6, the spacer 7, the gland packings 8, and the packing follower 9 are laminated in this order from the side closer to the valve plug 2 between the inner wall of the through-hole 5a of the stuffing box 5 and the valve stem 4.

The guide ring 6 is a component for guiding the sliding in the Z axis direction of the valve stem 4. The spacer 7 is a component for padding the space between the inner wall of the through-hole 5a of the stuffing box 5 and the valve stem 4 and holding the gland packings 8. The spacer 7 is fixed in the stuffing box 5. As indicated by, for example, reference numeral 50 in FIG. 1, the spacer 7 is fixed in the stuffing box 5 by being placed on the boundary surface at which the diameter of the through-hole 5a of the stuffing box 5 changes.

The gland packings 8 include, for example, rectangular (substantially square) packings in cross-sectional view on the X-Z plane and the plurality of gland packings 8 laminated with each other is disposed on the surface (surface of the spacer 7 in the positive side of the Z axis) of the spacer 7 away from the valve box 1.

In the embodiment, a plurality of packings (for example, yarn packings) of the same type may be used as the plurality of gland packings 8, a combination of packings of different types (for example, yarn packings and adapter packings) may be used, and the type, the number, and the shape of the gland packings 8 are not specially limited.

The packing follower 9 is made of, for example, a metal material, and is one of components (packing retainers) for pressing the gland packings 8 against the spacer 7. The packing follower 9 is disposed at the end of the plurality of gland packings 8 away from the spacer 7 in the through-hole 5a of the stuffing box 5.

Figure 4:
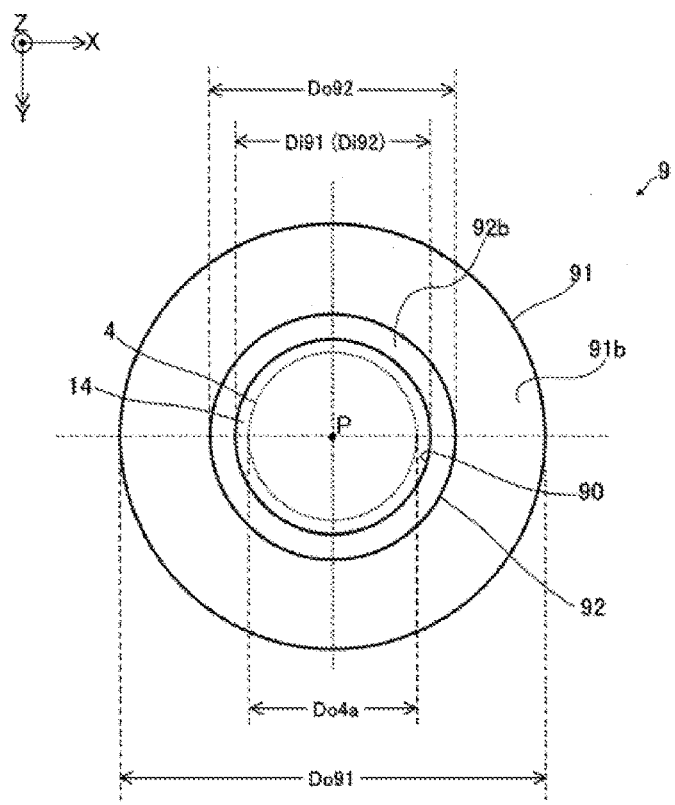
FIG. 4 schematically illustrates a planar structure of a packing follower of the regulating valve according to embodiment 1.

FIG. 4 schematically illustrates a planar structure of the packing follower 9.

As illustrated in FIGS. 2 to 4, the packing follower 9 has the structure in which two cylindrical portions 91 and 92 having different outer diameters are connected concentrically with each other in the direction (Z axis direction) of an axial line P of the valve stem 4. Specifically, the packing follower 9 has a through-hole 90 into which the valve stem 4 is inserted, the cylindrical portion 91 being positioned closer to the gland packings 8, and the cylindrical portion 92 concentrically extending in a direction of the axial line P of the valve stem 4 from the end of the cylindrical portion 91 away from the gland packings 8. In other words, the packing follower 9 is formed in a convex shape in plan view as seen from the Y axis direction and has the through-hole 90 along the Z axis.

An inner diameter Di91 of the cylindrical portion 91 is equal to an inner diameter Di92 of the cylindrical portion 92. In addition, an outer diameter Do91 of the cylindrical portion 91 is larger than an outer diameter Do92 of the cylindrical portion 92.

The packing follower 9 is disposed in the through-hole 5a of the stuffing box 5 so that the cylindrical portion 91 is positioned closer to the gland packings 8 and the valve stem 4 is inserted into the through-hole 90.

As illustrated in FIGS. 2 to 4, since the outer diameter of the cylindrical portion 91 is different from the outer diameter of the cylindrical portion 92, a principal surface 91b orthogonal to the axial line P (parallel to the X-Y plane) of the valve stem 4 is formed at the border between the cylindrical portion 91 and the cylindrical portion 92 in the cylindrical portion 91. The principal surface 91b is annular in plan view as seen from the Z axis direction, as illustrated in FIG. 4.

In addition, a principal surface 92b orthogonal to the axial line P of the valve stem 4 (parallel to the X-Y plane) is formed at the end of the cylindrical portion 92 away from the valve box 1. The principal surface 92b is annular in plan view as seen from the Z axis direction, as illustrated in FIG. 4.

The plurality of disc springs 10 laminated with each other are disposed on the principal surface 91b of the cylindrical portion 91 of the packing follower 9.

The disc springs 10 are components for suppressing increase in the contact surface pressure between the gland packings 8 and the valve stem 4 due to expansion of the gland packings 8, and for suppressing reduction in the pressure for pushing the gland packings 8 due to looseness of the gland studs 12 and the gland nuts 13, which will be described later.

As illustrated in FIGS. 2 and 3, the plurality of disc springs 10 laminated with each other are disposed on the principal surface 91b of the cylindrical portion 91 of the packing follower 9 away from the valve box. Specifically, the disc spring 10 disposed in the lowermost layer (negative direction in the Z axis) in the plurality of disc springs 10 is disposed on the surface 91b (surface in the positive side of the Z axis) of the cylindrical portion 91 of the packing follower 9 and the disc spring 10 disposed in the uppermost layer (positive direction in the Z axis) makes contact with the packing flange 11, which will be described later.

FIGS. 2 and 3 illustrate, as an example, the case in which eight disc springs 10 laminated with each other are disposed on the packing follower 9.

The packing flange 11 is a component for fixing the spacer 7, the gland packings 8, the packing follower 9, and the disc springs 10 onto the stuffing box 5.

Figure 5:
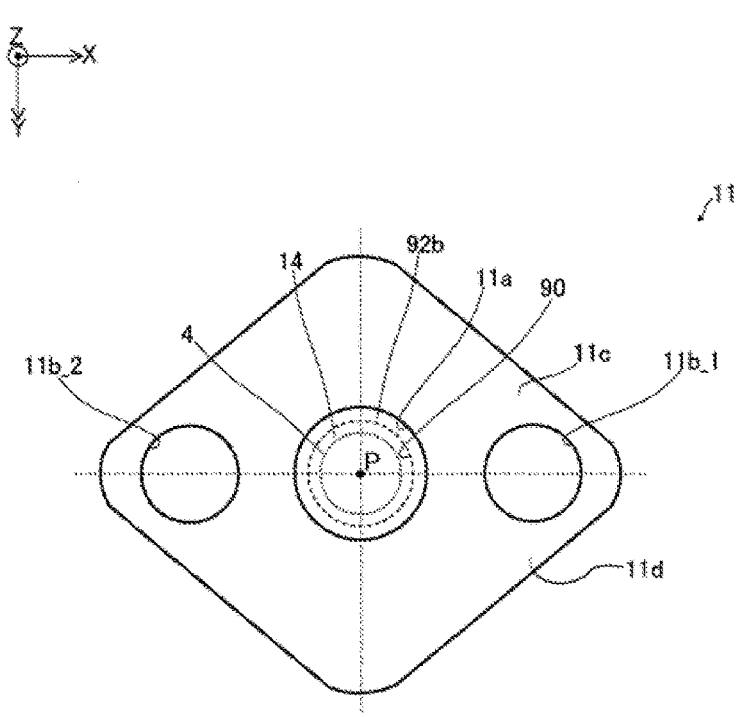
FIG. 5 schematically illustrates a planar structure of a packing flange of the regulating valve according to embodiment 1.

FIG. 5 schematically illustrates a planar structure of the packing flange 11 of the regulating valve 100 according to embodiment 1.

As illustrated in FIGS. 2, 3, and 5, the packing flange 11 is formed in, for example, a rhombus in plan view as seen from the Z axis direction and has principal surfaces 11c and 11d orthogonal to the axial line P of the valve stem 4. The packing flange 11 is disposed on the disc springs 10 so that the principal surface 11d thereof is closer to the valve box 1.

The packing flange 11 has three through-holes 11b_1, 11b_2, and 11a penetrating through the principal surface 11c and the principal surface 11d.

The through-holes 11b_1 and 11b_2 are holes into which the gland studs 12 are inserted. The packing flange 11 is fixed to the stuffing box 5 by tightening the gland studs 12 inserted into the through-holes 11b_1 and 11b_2 via the gland nuts 13 and having ends of the gland nuts 12 screwed with screw holes 5b_1 and 5b_2 formed in the stuffing box 5. This fixes the disc springs 10 and the packing follower 9 while the disc springs 10 and the packing follower 9 are pressed in the negative direction of the Z axis. As a result, a compression pressure is applied to the gland packings 8 from the direction of the axial line P of the valve stem 4, thereby enabling sealing between the valve stem 4 and the through-hole 5a of the stuffing box 5.

On the other hand, the through-hole 11a is a hole into which the packing follower 9 is inserted. Specifically, as illustrated in FIGS. 2 and 3, the cylindrical portion 92 of the packing follower 9 is inserted into the through-hole 11a of the packing flange 11. The packing flange 11 is fixed to the packing follower 9 by fitting the cylindrical portion 92 of the packing follower 9 to the through-hole 11a The tolerance for fitting the cylindrical portion 92 of the packing follower 9 to the through-hole 11a of the packing flange 11 corresponds to, for example, clearance fitting or intermediate fitting.

As described above, the packing flange 11 holds the plurality of disc springs 10 between the principal surface 91b of the cylindrical portion 91 of the packing follower 9 and the packing flange 11 by tightening the gland studs 12 inserted into the through-holes 11b_1 and 11b_2 via the gland nuts 13. In addition, the packing flange 11 prevents the packing flange 11 from deviating in the X axis direction or the Y axis direction when the packing flange 11 is fixed to the stuffing box 5 by fitting the cylindrical portion 92 of the packing follower 9 to the through-hole 11a.

The regulating valve 100 according to embodiment 1 is formed so that the tightening torque of the gland nuts 13 becomes a specified torque if the height of the principal surface 92b (away from the valve box) of the cylindrical portion 92 of the packing follower 9 is equal to the height of the principal surface 11c (away from the valve box) of the packing flange 11 as seen from the direction (the X axis direction or the Y axis direction) orthogonal to the valve stem 4 (that is, if the principal surface 92b and the principal surface 11c form a single X-Y plane) when the packing flange 11 is fixed to the stuffing box 5.

As described above, the valve stem 4 is inserted into the through-hole 5a of the stuffing box 5 via the through-hole 90 of the packing follower 9. At this time, the valve stem 4 is disposed so as not to make contact with the packing follower 9.

Specifically, as illustrated in FIGS. 3 and 4, the inner diameter Di91 of the cylindrical portion 91 of the packing follower 9 and the inner diameter Di92 of the cylindrical portion 92 of the packing follower 9 are larger than an outer diameter Do4a of the part of the valve stem 4 corresponding to the packing follower 9. Accordingly, when the valve stem 4 is disposed concentrically with the packing follower 9, a gap 14 is formed between the valve stem 4 and the packing follower 9.

Similarly, as illustrated in FIG. 3, an inner diameter Di7 of the spacer 7 is larger than an outer diameter Do4b (Do4a=Do4b as an example here) of the part of the valve stem 4 corresponding to the spacer 7. Accordingly, when the valve stem 4 is disposed concentrically with the spacer 7, a gap 15 is formed between the valve stem 4 and the spacer 7.

Accordingly, when the valve stem 4 slides in the Z axis direction, the valve stem 4 makes contact with the guide ring 6 and the gland packings 8 in the gland portion 3 without making contact with the packing follower 9 or the spacer 7.

Since the regulating valve 100 according to embodiment 1 has the guide ring 6 in the gland portion 3, even when the valve stem 4 does not make contact with the packing follower 9 or the spacer 7 in the gland portion 3, the guide ring 6 can guide the sliding of the valve stem 4 in the Z axis direction.

Since the regulating valve 100 according to embodiment 1 has the structure in which the disc springs 10 are disposed on the principal surface 91b of the cylindrical portion 91 of the packing follower 9 and the disc springs 10 are pressed by the packing flange 11 in the direction of the axis P of the valve stem 4, the disc springs can be held without using a spring case in the gland portion 3. This can reduce the production cost of the regulating valve.

In addition, since a spring case does not need to be used, the space occupied by the spring case in the conventional regulating valve can be used to increase the number of the disc springs 10 laminated between the packing follower 9 and the packing flange 11. This can further improve the leakage prevention performance for thermal cycles as compared with the conventional regulating valve using a spring case.

In addition, since the packing flange 11 is fixed to the packing follower 9 by fitting the cylindrical portion 92 of the packing follower 9 to the through-hole 11a of the packing flange 11 in the regulating valve 100 according to embodiment 1, even when the gland nuts 13 are tightened without using, for example, a torque wrench, the packing flange 11 is not disposed obliquely with respect to the axial line P of the valve stem 4 and the two gland nuts 13 are tightened evenly. This makes the compression load applied to the gland packings 8 uniform and prevents the leakage of the fluid from the gap between the valve stem 4 and the gland packings 8.

In addition, since the gap 14 is formed between the valve stem 4 and the inner wall of the packing follower 9 in the regulating valve 100 according to embodiment 1, wear of the valve stem 4 and the packing follower 9 is not caused due to application of a high pressure between the valve stem 4 and the packing follower 9, unlike the regulating valve disclosed in PTL 2, thereby preventing reduction in the seal performance due to entry of wear powder into the gap between the gland packings 8 and the valve stem 4.

Similarly, since the gap 15 is formed between the valve stem 4 and the spacer 7, there is no possibility of occurrence of wear due to contact between the valve stem 4 and the spacer 7.

The regulating valve 100 according to embodiment 1 can suppress deterioration of the seal performance of the gland portion of the regulating valve, while reducing the manufacturing cost.

In addition, since the regulating valve 100 according to embodiment 1 has the structure in which the tightening torque of the gland nuts 13 becomes a specified torque if the height of the principal surface 92b (away from the valve box) of the cylindrical portion 92 of the packing follower 9 is equal to the height of the principal surface 11c (away from the valve box) of the packing flange 11 as seen from the direction (X axis direction) orthogonal to the valve stem 4 when the packing flange 11 is fixed to the stuffing box 5, for example, a worker can tighten the gland nuts 13 with a predetermined torque only by visual confirmation without using a torque wrench.

Embodiment 2

Figure 6:
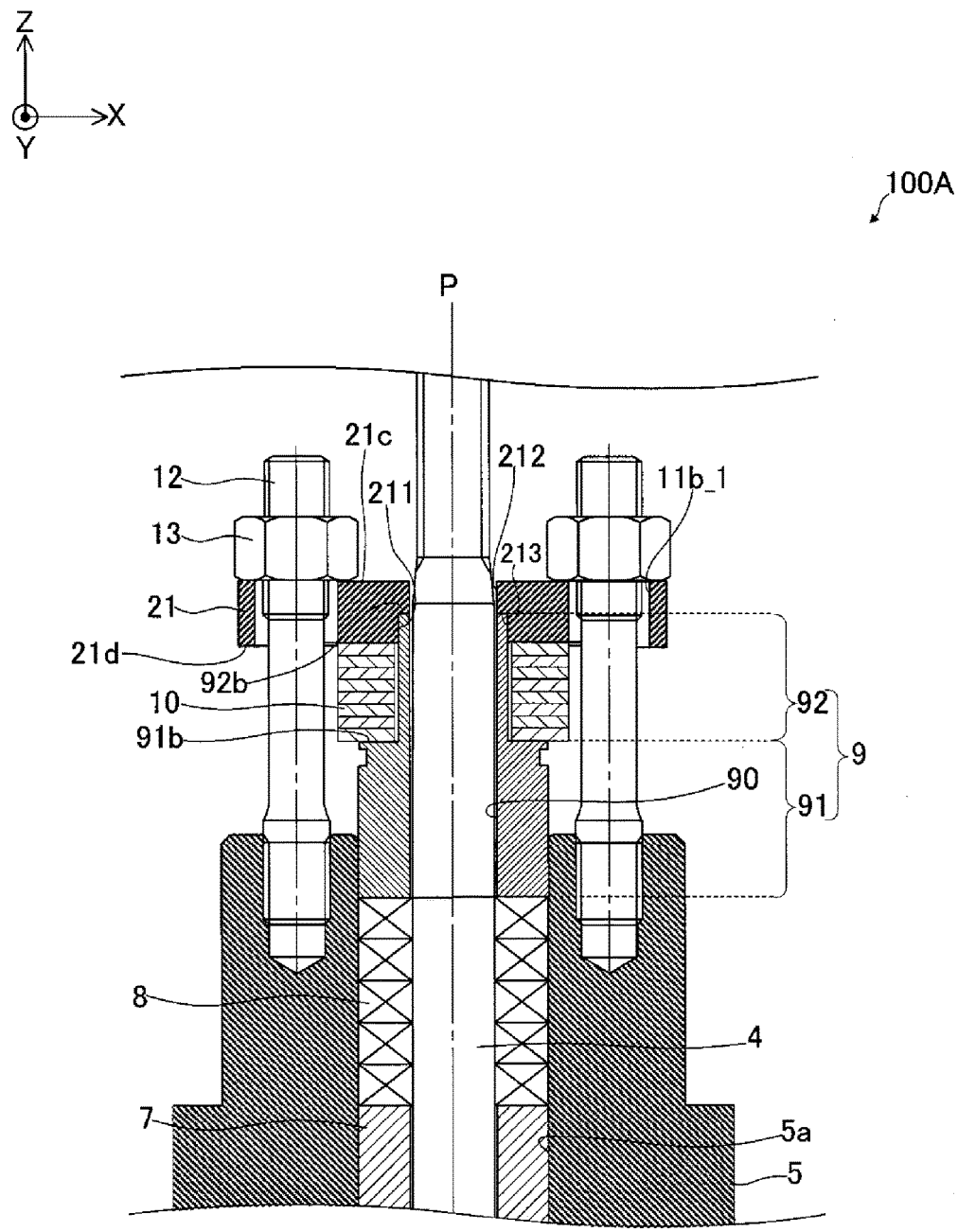
FIG. 6 schematically illustrates the cross-sectional structure of a gland portion of the regulating valve according to embodiment 2.

FIG. 6 schematically illustrates the cross-sectional structure of the gland portion of the regulating valve according to embodiment 2.

Figure 7:
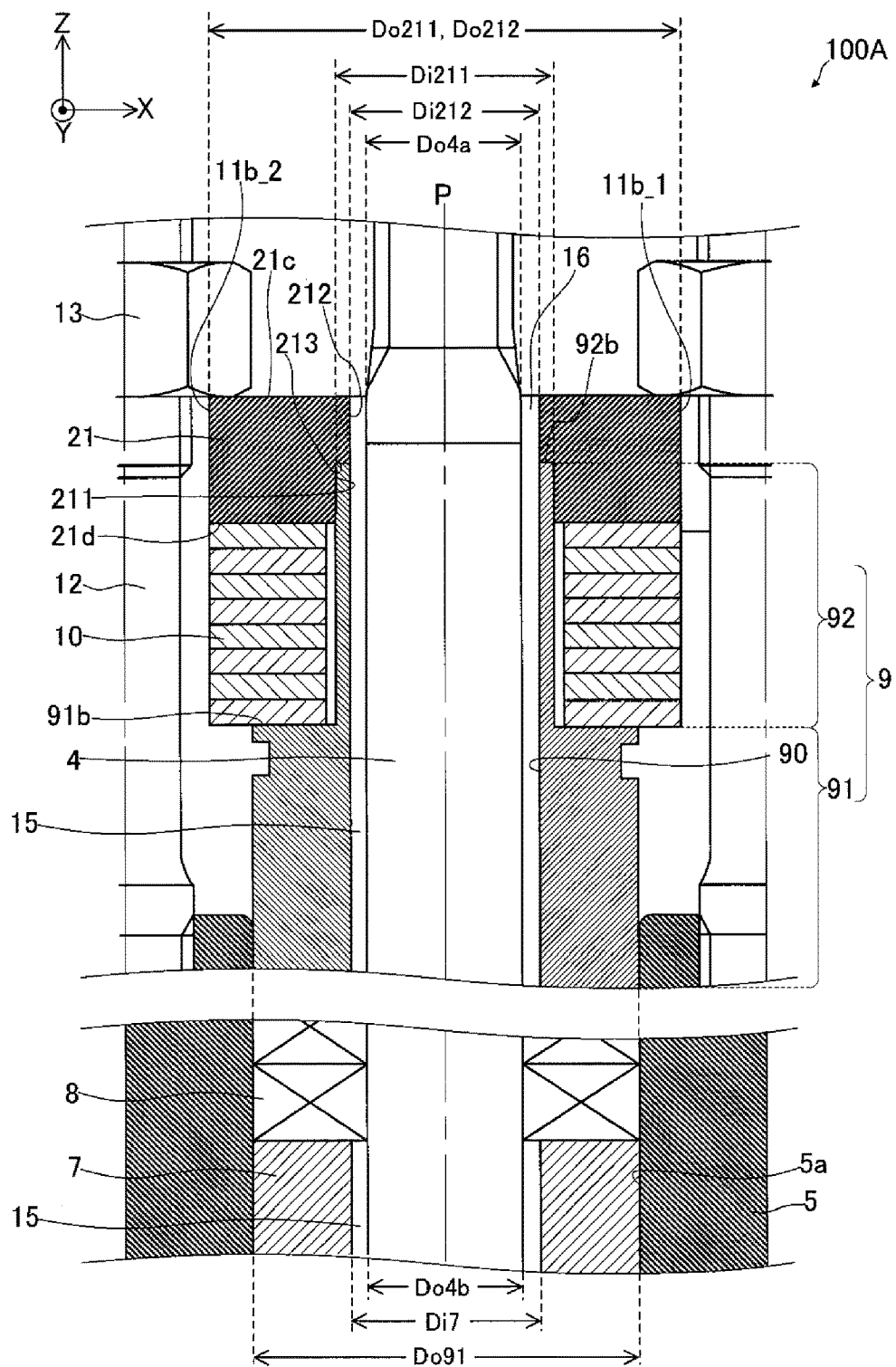
FIG. 7 is an enlarged view illustrating a part of the cross-sectional structure of the gland portion illustrated in FIG. 6.

FIG. 7 is an enlarged view illustrating a part of the cross-sectional structure of the gland portion illustrated in FIG. 6.

Figure 8:
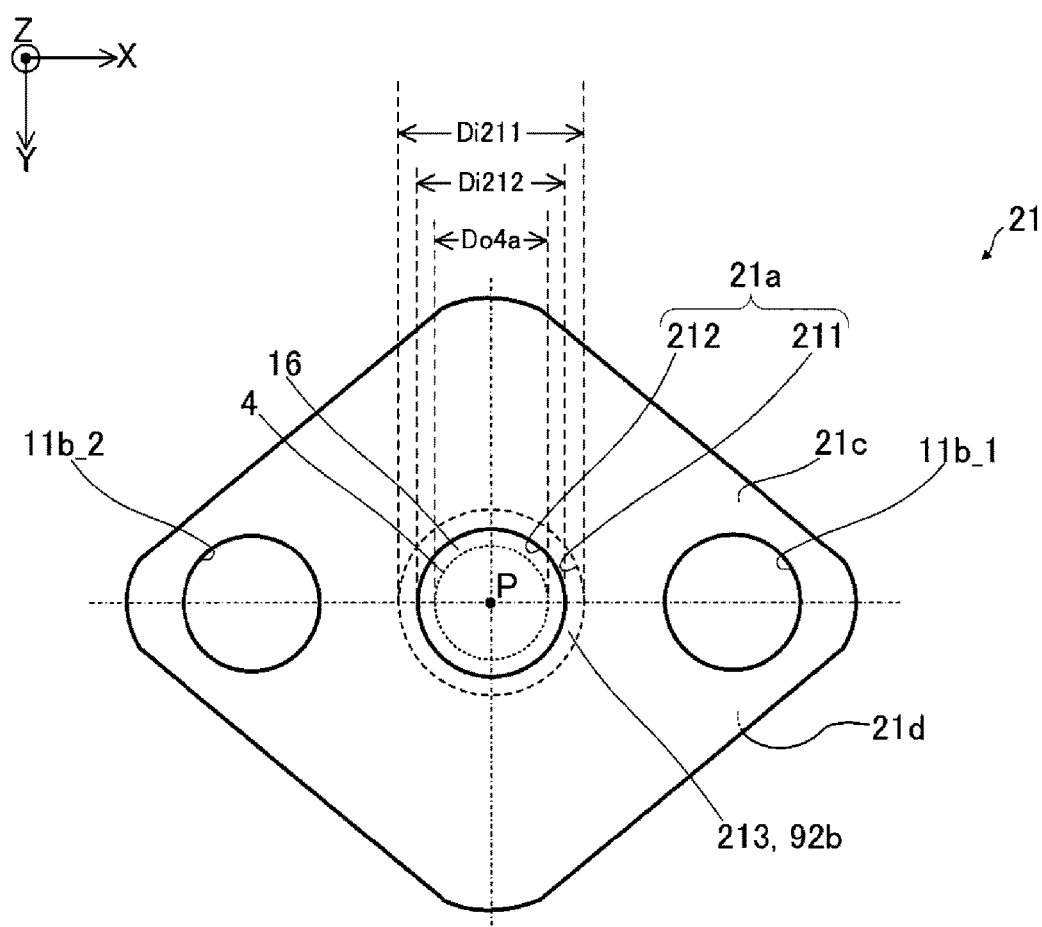
FIG. 8 schematically illustrates a planar structure of a packing flange of the regulating valve according to embodiment 2.

FIG. 8 schematically illustrates the planar structure of a packing flange of the regulating valve according to embodiment 2.

As illustrated in FIGS. 6 to 8, a regulating valve 100A according to embodiment 2 is the same as the regulating valve 100 according to embodiment 1 except that a through-hole 21a of a packing flange 21 into which the valve stem 4 and the packing follower 9 are inserted is configured by two holes 211 and 212 having different diameters.

Specifically, the packing flange 21 is formed in, for example, a rhombus in plan view as seen from the Z axis direction, as illustrated in FIG. 8, and has principal surfaces 21c and 21d orthogonal to the axial line P of the valve stem 4, as illustrated in FIGS. 6 to 8. The packing flange 21 is disposed on the disc springs 10 so that the principal surface 21d is closer to the valve box 1.

The packing flange 21 has the through-hole 21a, which penetrates through the principal surface 21c and the principal surface 21d and into which the valve stem 4 and the packing follower 9 are inserted, in addition to the through-holes 11b_1 and 11b_2, into which the gland studs 12 are inserted.

As illustrated in FIGS. 6 to 8, the through-hole 21a is configured by the two holes 211 and 212 having different diameters and connected in the direction of the axial line P of the valve stem 4. Specifically, the through-hole 21a has the structure in which the hole 212 formed in the principal surface 21c of the packing flange 21 in the direction of the axial line P of the valve stem 4 is connected to the hole 211 formed in the principal surface 21d of the packing flange 21 in the direction of the axial line P of the valve stem 4. As illustrated in FIGS. 7 and 8, a diameter Di211 of the hole 211 is larger than a diameter Di212 of the hole 212.

That is, the packing flange 21 has the structure in which the through-hole 21a, which is convex in plan view as seen from the Y axis direction, is formed concentrically with the axial line P of the valve stem 4.

The hole 211 is formed concentrically with the through-hole 90 of the packing follower 9 and receives the cylindrical portion 92 of the packing follower 9. The packing flange 21 is fixed to the cylindrical portion 92 by fitting the outer peripheral surface of the cylindrical portion 92 of the packing follower 9 to the hole 211.

The tolerance for fitting the cylindrical portion 92 of the packing follower 9 to the hole 211 of the packing flange 21 corresponds to, for example, clearance fitting or intermediate fitting.

The hole 212 is concentrically connected to the hole 211 and receives the valve stem 4.

As illustrated in FIGS. 7 and 8, the diameter Di212 of the hole 212 of the packing flange 21 is larger than the outer diameter Do4a of the part of the valve stem 4 corresponding to the packing flange 21. Accordingly, when the valve stem 4 is inserted into the through-hole 90 of the packing follower 9 via the hole 212, the gap 16 is formed between the valve stem 4 and the inner wall of the hole 212 of the packing flange 21.

In addition, since the diameter of the hole 211 is different from the diameter of the hole 212, the through-hole 21a of the packing flange 21 is provided with a surface (referred to below as a boundary surface) 213 orthogonal to (parallel to the X-Y plane) the axial line P of the valve stem 4 at the border between the hole 211 and the hole 212.

In the regulating valve 100A according to embodiment 2, if the above boundary surface 213 makes contact with the part of the principal surface 92b of the cylindrical portion 92 of the packing follower 9 away from the valve box 1 when the packing flange 21 is fixed to the stuffing box 5 by tightening the gland nuts 13, the tightening torque of the gland nuts 13 becomes a specified torque.

Accordingly, since a worker can recognize that the gland nuts have been tightened with a specified torque through the feeling obtained when the principal surface 92b of the packing follower 9 makes mechanical contact with the boundary surface 213 inside of the packing flange 21, it is possible to easily tighten the gland nuts with a specified torque without using a torque wrench.

Expansion of Embodiments

Although the invention implemented by the inventors has been described above specifically based on embodiments, the invention is not limited to the embodiments and it will be appreciated that various modifications can be made without departing from the scope of the invention.

For example, in the regulating valves 100 and 100A according to embodiments 1 and 2, the guide (carbon) ring 6 may be further disposed in the slide direction (Z axis direction) of the valve stem 4 by sandwiching the gland packing 8 therebetween to prevent damage due to deformation of the gland packings 8.

DESCRIPTION OF REFERENCE NUMERALS AND SIGNS 100, 100A: regulating valve, 1: valve box, 2: valve plug, 3: gland portion, 4: valve stem, 5: stuffing box (lid member), 6: guide ring, 7: spacer, 8: gland packing, 9: packing follower, 10: disc spring, 11, 21: packing flange, 12: gland stud, 13: gland nut, 14, 15, 16: gap, 91, 92: cylindrical portion, 5a, 5b_1, 5b_2, 11a, 11b_1, 11b_2, 21a, 90: through-hole, 211, 212: hole, 213: boundary surface, 11c, 11d, 21c, 21d: principal surface of packing flange, 91b: principal surface of cylindrical portion 91, 92b: principal surface of cylindrical portion 92, P: axial line

The invention claimed is:

1. A regulating valve comprising:
a valve box;
a valve plug disposed in the valve box;
a valve stem for driving the valve plug; and
a gland portion slidably holding the valve stem,
wherein the gland portion comprises
    a lid member mounted to the valve box and having a first through-hole into which the valve stem is inserted,
    a spacer fixed between an inner wall of the first through-hole and the valve stem,
    a plurality of gland packings laminated in a direction of an axis of the valve stem, the gland packings being disposed at an end of the spacer, the end being away from the valve box,
    a packing follower comprising:
        a second through-hole into which the valve stem is inserted, the packing follower being disposed at an end of the plurality of gland packings away from the spacer,
        a first cylindrical portion disposed closer to the gland packings, and
        a second cylindrical portion extending concentrically in the direction of the axis of the valve stem from an end of the first cylindrical portion away from the gland packing, the second cylindrical portion having an outer diameter smaller than an outer diameter of the first cylindrical portion,
    a plurality of disc springs disposed on the first cylindrical portion of the packing follower so as to surround the second cylindrical portion of the packing follower,
    a packing flange having a third through-hole into which the second cylindrical portion of the packing follower is inserted, the packing flange being disposed on the plurality of disc springs, and
    a gland nut for fixing the packing flange to the lid member of the valve box by tightening to an attachment,
wherein the second cylindrical portion has a first principal surface orthogonal to the valve stem at an end away from the valve box,
the third through-hole of the packing flange comprises a first hole formed in a part thereof closer to the valve box, the first hole being formed concentrically with the second through-hole, and a second hole formed in a part thereof away from the valve box, the second hole being connected to the first hole, the second hole having a diameter smaller than the first hole,
the packing flange is fixed to the packing follower by fitting an outer peripheral surface of the second cylindrical portion to the first hole, the valve stem is inserted into the second through-hole of the packing follower through the second hole, a gap is formed between the second hole and the valve stem, and a tightening torque of the gland nut is a specified torque when the first principal surface makes contact with a boundary surface between the first hole and the second hole of the packing flange.

2. A regulating valve comprising:

a valve box;

a valve plug disposed in the valve box;

a valve stem for driving the valve plug; and a gland portion slidably holding the valve stem, wherein the gland portion comprises a lid member mounted to the valve box and having a first through-hole into which the valve stem is inserted, a spacer fixed between an inner wall of the first through-hole and the valve stem, a plurality of gland packings laminated in a direction of an axis of the valve stem, the gland packings being disposed at an end of the spacer, the end being away from the valve box, a packing follower comprising:

a second through-hole into which the valve stem is inserted, the packing follower being disposed at an end of the plurality of gland packings away from the spacer, a first cylindrical portion disposed closer to the gland packings, and a second cylindrical portion extending concentrically in the direction of the axis of the valve stem from an end of the first cylindrical portion away from the gland packing, the second cylindrical portion having an outer diameter smaller than an outer diameter of the first cylindrical portion, a plurality of disc springs disposed on the first cylindrical portion of the packing follower so as to surround the second cylindrical portion of the packing follower, a packing flange having a third through-hole into which the second cylindrical portion of the packing follower is inserted, the packing flange being disposed on the plurality of disc springs, and two or more gland nuts for fixing the packing flange to the lid member of the valve box by tightening to a respective attachment, wherein the second cylindrical portion has a first principal surface orthogonal to the valve stem at an end away from the valve box, the third through-hole of the packing flange comprises a first hole formed in a part thereof closer to the valve box, the first hole being formed concentrically with the second through-hole, and a second hole formed in a part thereof away from the valve box, the second hole being connected to the first hole, the second hole having a diameter smaller than the first hole, the packing flange is fixed to the packing follower by fitting an outer peripheral surface of the second cylindrical portion to the first hole, the valve stem is inserted into the second through-hole of the packing follower through the second hole, a gap is formed between the second hole and the valve stem, and tightening torques of the two or more gland nuts are approximately equal when the first principal surface makes contact with a boundary surface between the first hole and the second hole of the packing flange.

* * * * *